United States Patent
Hayakawa et al.

(10) Patent No.: US 8,002,099 B2
(45) Date of Patent: Aug. 23, 2011

(54) CLUTCH OPERATION MECHANISM

(75) Inventors: Koshi Hayakawa, Saitama (JP); Kanau Iwashita, Saitama (JP); Yoshihisa Ieda, Saitama (JP); Akihiko Tomoda, Saitama (JP); Katsumi Sahoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 687 days.

(21) Appl. No.: 12/109,033

(22) Filed: Apr. 24, 2008

(65) Prior Publication Data

US 2009/0266671 A1  Oct. 29, 2009

(30) Foreign Application Priority Data

Apr. 27, 2007 (JP) ................ 2007-120046

(51) Int. Cl.
  *B62M 25/04* (2006.01)
  *B62M 25/08* (2006.01)
  *F16D 48/06* (2006.01)
(52) U.S. Cl. ...... 192/83; 192/84.6; 192/85.5; 192/85.57
(58) Field of Classification Search ............... 192/83, 192/85.5
See application file for complete search history.

(56) References Cited

U.S. PATENT DOCUMENTS

| 5,109,968 | A | | 5/1992 | Pollitt et al. |
| 5,135,091 | A | * | 8/1992 | Albers et al. ............... 192/83 |
| 5,839,561 | A | * | 11/1998 | Koda et al. ............... 192/84.6 |
| 2006/0169562 | A1 | * | 8/2006 | Kosugi ............... 192/83 |

FOREIGN PATENT DOCUMENTS

JP  2004-196067  7/2004

* cited by examiner

*Primary Examiner* — Rodney H Bonck
(74) *Attorney, Agent, or Firm* — Birch, Stewart, Kolasch & Birch, LLP

(57) ABSTRACT

A clutch operation mechanism wherein when a clutch is disengaged and engaged by manual operation or by operation of an actuator the one operation does not affect the other operation. The clutch operation mechanism includes a lever side lost mechanism which is disposed between a clutch lever and a turn-operating force transmitting member for interrupting, from the clutch lever side, an operated-force applied from the turn-operating force transmitting member by driving the electric motor when the clutch lever is not operated. A motor side lost mechanism is disposed between the electric motor and the turn-operating force transmitting member and interrupts, from the side of the electric motor, the operated-force applied from the turn-operating force transmitting member by operating the clutch lever when the electric motor is not operated.

16 Claims, 15 Drawing Sheets

CLUTCH OPERATION MECHANISM

CROSS-REFERENCE TO RELATED APPLICATIONS

The present application claims priority under 35 USC 119 to Japanese Patent Application No. 2007-120046 filed on Apr. 27, 2007 the entire contents of which are hereby incorporated by reference.

BACKGROUND OF THE INVENTION

1. Field of the Invention

The present invention relates to an improvement in a clutch operation mechanism.

2. Description of Background Art

A conventional clutch operation mechanism is known wherein a clutch actuator is provided to assist a manual operation force for a clutch. See, for example, Japanese Patent Laid-Open No. 2004-196067.

FIGS. 1 and 7 of Japanese Patent Laid-Open No. 2004-196067 are described below.

A clutch lever 7 is connected to an arm 10 via a wire 9 and an electric actuator 24 is connected to the arm 10 via a wire 9a to assist a clutch manual operation force.

The arm 10 is pivotally attached to a pinion shaft 11. Operation of the clutch lever 7 or actuation of the electric actuator 24 turns the pinion shaft 11 via the arm 10. A pinion 12 secured to the pinion shaft 11 meshes with a rack 13. The turn of the pinion shaft 11 axially moves the rack 13 to disengage or engage a clutch.

In Japanese Patent Laid-Open No. 2004-196067, an end of the wire 9 for the clutch lever 7 and an end of the wire 9a for the electric actuator 24 are connected to one and the same arm 10. Therefore, for example, the operation of the electric actuator 24 has an influence on the operation of the clutch lever 7 and the associated parts.

SUMMARY AND OBJECTS OF THE INVENTION

It is an object of the present invention to provide a clutch operation mechanism which, when a clutch is disengaged and engaged by manual operation or by operation of an actuator, the one operation does not affect the other operation.

According to an embodiment of the present invention, a clutch operation mechanism includes a clutch disengaging and engaging portion having a mechanism for disengaging and engaging a clutch, a clutch lever adapted to manually apply an operating force to the clutch disengaging and engaging portion, an electric motor capable of automatically applying a drive force to the clutch disengaging and engaging portion, a turn-operating force transmitting member which turns in conjunction with the operation of the clutch lever to enable transmission of an operating force to the clutch disengaging and engaging portion or with driving of the electric motor to enable transmission of a drive force to the clutch disengaging and engaging portion, a first lost mechanism which is located between the clutch lever and the turn-operating force transmitting member to interrupt, from the clutch lever side, an operated-force applied from the turning operating force transmitting member due to the driving of the electric motor when the clutch lever is not operated and a second lost mechanism which is located between the electric motor and the turning operating force transmitting member to interrupt, from the electric motor side, an operated-force applied from the turn-operating force transmitting member due to the operation of the clutch lever when the electric motor is not operated.

In operation, when the electric motor is driven to allow the clutch disengaging and engaging portion to automatically disengage and engage the clutch, the first lost mechanism located between the clutch lever and the turn-operating force transmitting member interrupts, from the clutch lever side, the operated-force applied from the turn-operating force transmission member due to the driving of the electric motor. Consequently, since the operated-force is not transmitted to the clutch lever side, no influence is exerted on the clutch lever side during the driving of the electric motor.

When the clutch lever is operated to allow the clutch disengaging and engaging portion to manually disengage and engage the clutch, the second lost mechanism located between the electric motor and the turn-operating force transmitting member interrupts, from the electric motor side, the operated-force applied from the turn-operating force transmitting member due to the operation of the clutch lever. Consequently, since the operated-force is not transmitted to the electric motor side, no influence is exerted on the electric motor side during the operation of the clutch lever.

According to an embodiment of the present invention, the clutch disengaging and engaging portion includes an operating cylinder connected to the clutch to perform disengaging and engaging operation of the clutch, a master cylinder for allowing the operating cylinder to generate hydraulic pressure and a hydraulic line for connecting the operating cylinder with the mater cylinder wherein an opening and closing control valve is provided on the hydraulic line.

In operation, the opening and closing control valve is provided on the hydraulic line and the oil passage of the hydraulic line is closed by the opening and closing control valve to maintain the hydraulic pressure in the operating cylinder, thereby maintaining the disengagement or partial engagement of the clutch.

According to an embodiment of the present invention, a clutch operation mechanism includes an operating cylinder connected to a clutch to perform disengaging and engaging operation of the clutch, a hydraulic line for connecting the operating cylinder with the master cylinder respectively, the master cylinder generating a hydraulic pressure in the operating cylinder, a clutch lever for manually operating the disengagement and engagement of the clutch, an electric motor for generating a drive force adapted to enable automatic disengagement and engagement of the clutch not by the manual operation, a first pressing portion for converting the clutch lever operating force into a pressing force, a second pressing portion for converting the electric motor drive force into a pressing force and a turn-pressing member turned by being pressed by the first or second pressing portion to apply a pressing force to the master cylinder wherein the first and second pressing portions are located at respective positions capable of turning the turn-pressing member in the same direction and opposite to the turning center of the turn-pressing member.

In operation, the pressing force can more easily be applied to the master cylinder in view of structure if the first and second pressing portions apply the pressing force to the master cylinder via the turn-pressing member than if the first and second pressing portions directly apply the pressing force to the master cylinder.

In addition, the first and second pressing portions are located at restive positions capable of turning the turn-pressing member in the same direction and opposite to the turning center of the turn-pressing member. Thus, the first and second pressing portions can be spaced apart from each other, which increases the arrangement flexibility of the first and second pressing portions.

According to an embodiment of the present invention, a clutch operation unit including the master cylinder, the first pressing portion, the second pressing portion, and the turn-pressing member, and in that the clutch operation unit is located at a portion surrounded by a body frame and a front cowl.

In operation, the clutch operation unit is disposed between the body frame and the front cowl, thereby being unsusceptible to the influence of heat from the engine and to be protected from an external force by use of the front cowl.

According to an embodiment of the present invention, the clutch operation unit is located close to the clutch lever.

In operation, a transmission loss of the operating force from the clutch lever is reduced. In addition, it is possible to make use of the operating system such as the master cylinder, etc., conventionally provided close to the clutch lever.

According to an embodiment of the present invention, an opening and closing control valve is provided on the hydraulic line.

In operation, the opening and closing control valve is provided on the hydraulic line and the oil passage of the hydraulic line is closed by the opening and closing control valve to maintain the hydraulic pressure in the operating cylinder, thereby maintaining the disengagement or partial engagement of the clutch.

According to an embodiment of the present invention, the drive force of the electric motor is transmitted to the second pressing portion via a worm.

In operation, the second pressing portion uses a wheel meshing with the worm. The meshing engagement of the worm with the second pressing portion makes it possible to keep the second pressing portion at a fixed position. This maintains the hydraulic pressure in the operating cylinder, thereby maintaining the disengagement or partial engagement of the clutch.

According to an embodiment of the present invention, the clutch operation mechanism includes the first lost mechanism which is located between the clutch lever and the turn-operating force transmitting member to interrupt, from the clutch lever side, an operated-force applied from the turn-operating force transmitting member due to the driving of the electric motor when the clutch lever is not operated and the second lost mechanism which is located between the electric motor and the turn-operating force transmitting member to interrupt, from the electric motor side, an operated-force applied from the turn-operating force transmitting member due to the operation of the clutch lever when the electric motor is not operated. Thus, when the clutch is automatically disengaged and engaged by the electric motor, the first lost mechanism can prevent the operated-force from being transmitted to the clutch lever side, thereby making it possible to exert no influence on the clutch lever side.

In addition, when the clutch is manually disengaged and engaged by the clutch lever, the second lost mechanism can prevent the operated-force from being transmitted to the electric motor side, thereby making it possible to exert no influence on the electric motor side.

In this way, the operability of the manual clutch can be enhanced during the use of automatic clutch. In addition, the convention operating system can be made use of for the clutch lever and for the operating cylinder as it is.

According to an embodiment of the present invention, the clutch disengaging and engaging portion includes the operating cylinder connected to the clutch to perform the disengaging and engaging operation of the clutch, the master cylinder for allowing the operating cylinder to generate hydraulic pressure and the hydraulic line for connecting the operating cylinder with the mater cylinder and the opening and closing control valve is provided on the hydraulic line. Thus, at the time of parking during operation of the automatic clutch, during the partial clutch engagement or the like, the disengagement or partial engagement of the clutch can be maintained without constantly driving the electric motor. This makes it possible to reduce a burden on the electric motor, thereby reducing power consumption.

According to an embodiment of the present invention, the clutch operation mechanism includes the first pressing portion for converting the clutch lever operating force into a pressing force, the second pressing portion for converting the electric motor drive force into a pressing force and the turn-pressing member turned by being pressed by the first or second pressing portion to apply a pressing force to the master cylinder wherein the first and second pressing portions are located at the respective positions capable of turning the turn-pressing member in the same direction and opposite to the turning center of the turn-pressing member. Thus, the structure of allowing the first and second pressing portions to apply a pressing force to the master cylinder via the turn-pressing member can be more simplified than the structure of allowing the first and second pressing portions to directly apply a pressing force to the master cylinder, thereby reducing cost.

The first and second pressing portions can be located opposite to each other with respect to the turning center of the turn-pressing member, so that the first and second pressing portions can be spaced apart from each other. Thus, the arrangement flexibility of the first and second pressing portions can be increased.

According to an embodiment of the present invention, the clutch operation mechanism includes the clutch operation unit including the master cylinder, the first pressing portion, the second pressing portion, and the turn-pressing member, and the clutch operation unit is located at a portion surrounded by a body frame and a front cowl. Thus, this unit can compactly be assembled as a unit so that it can easily be arranged by utilizing the narrow space of the vehicle body. In addition, the unit is provided between the main frame and the front cowl to be unsusceptible to the influence of heat from the engine and to be protected from an external force by use of the front cowl.

According to an embodiment of the present invention, since the clutch operation unit is located close to the clutch lever, a transmission loss of the operating force from the clutch lever can be minimized and the conventional operating system can be made use of as it is. In other words, it is possible to add components including from the electric motor to the operating cylinder forming the second pressing portion, to the conventional hydraulic clutch later.

According to an embodiment of the present invention, since the opening and closing control valve is provided on the hydraulic line, the disengagement or partial engagement of the clutch can be maintained without constantly driving the electric motor during the stoppage of the automatic operation of the clutch or during the partial engagement of the clutch. Thus, the burden on the electric motor can be reduced to reduce power consumption.

According to an embodiment of the present invention, since the drive force of the electric force is transmitted to the second pressing portion via the worm, the disengagement or partial engagement of the clutch during the automatic operation of the clutch can be maintained without use of the opening and closing control valve. This can reduce a burden on the electric motor, thereby reducing power consumption.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
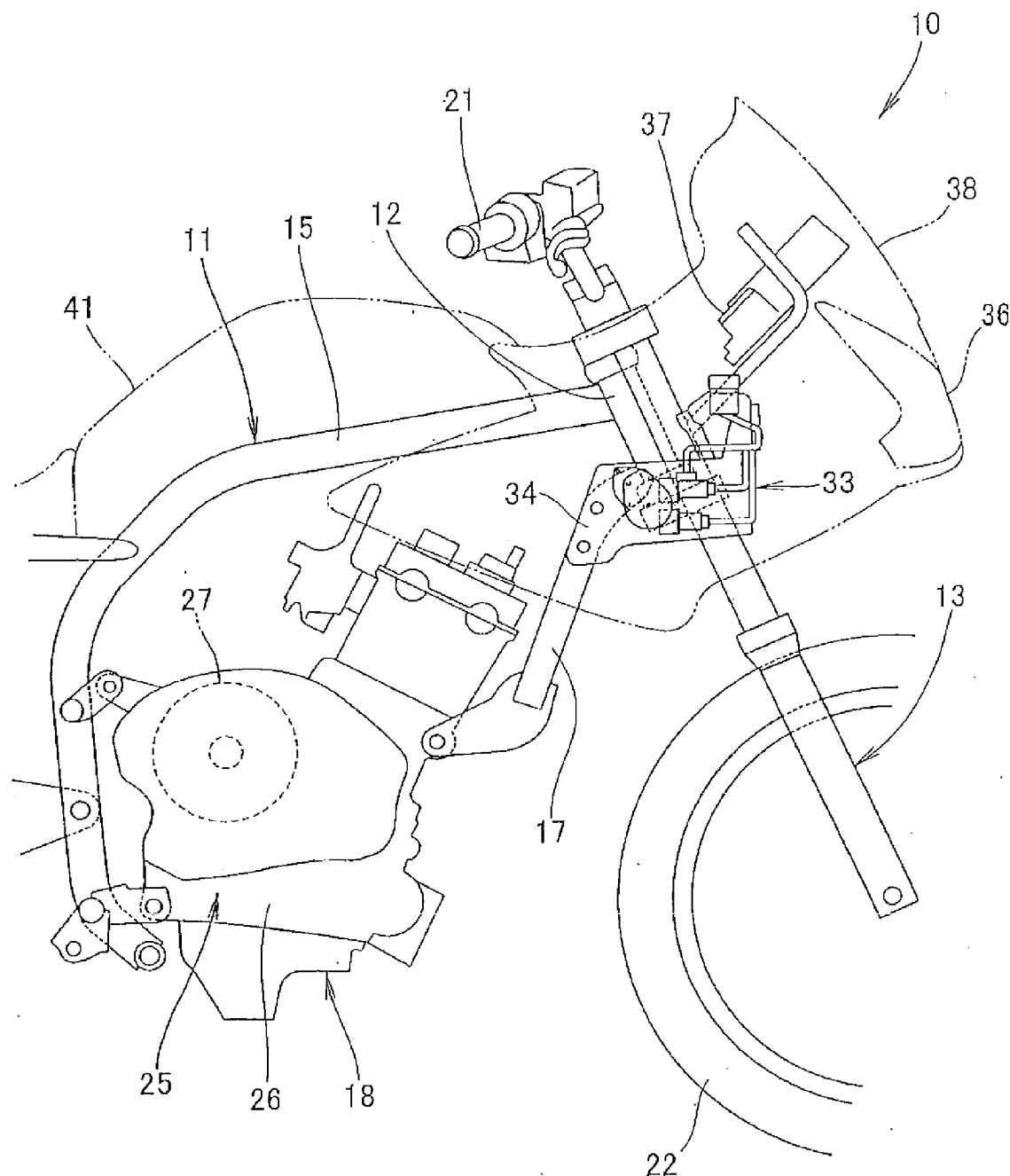
FIG. 1 is a lateral view of a vehicle front portion provided with a clutch operation mechanism (a first embodiment) according to the present invention.

The best mode for carrying out the present invention will hereinafter be described with reference to the accompany drawings. It is to be noted that the drawings should be viewed on the basis of the direction of reference numerals.

FIG. 1 is a lateral view of a vehicle front portion provided with a clutch operation mechanism (a first embodiment) according to the present invention. A vehicle 10 is such that a front fork 13 is steerably attached to a head pipe 12 constituting the front end of a body frame 11. In addition, to constitute the body frame 11, a pair of left and right main frames 14, 15 (only reference numeral 15 on the front side is shown) extend rearward from the head pipe 12 and a pair of left and right down frames 16, 17 (only reference numeral 17 on the front side is shown) extend downward from the head pipe 12. An engine 18 is mounted to the main frames 14, 15 and to the down frames 16, 17.

A handlebar 21 is attached to the upper portion of the front fork 13 and a front wheel 22 is attached to the lower end of the front fork 13.

A transmission 25 is integrally attached to the rear portion of the engine 18. A clutch 27 is housed in a crankcase 26 which serves as a casing for the engine 18 and transmission 25. The clutch 27 transmits or interrupts power between the output side of the engine 18 and the input side of the transmission 25 for executing the transmission or interruption of the power.

An actuator unit 33 is attached to the right-hand down frame 17 via a bracket 34. The actuator unit 33 serves as a clutch operation unit to automatically execute the disengagement and engagement of the clutch 27. In addition, in FIG. 1, a headlamp 36, a meter 37, a front cowl 38 which covers both sides of and the front of a vehicle body front portion including the actuator unit 33, and a fuel tank 41 are provided.

The actuator unit 33 is disposed between the front cowl 38 and the head pipe 12 and front fork 13 constituting the body frame 11 and is a device constituting part of a clutch operation mechanism described later.

The clutch operation mechanism of the present invention usually detects a tread force of a gear change pedal, a vehicle speed and the like and automatically disengages and engages the clutch 27 by use of e.g. the actuator unit 33 at the time of gear-change. In addition, the clutch operation mechanism can manually disengage and engage the clutch 27 by use of the clutch lever as necessary.

Since the actuator unit 33 is disposed between the head pipe 12 and front fork 13, and the front cowl 38 as described above, it is not influenced by the heat of the engine 18 and can be protected against an external force by use of the front cowl 38.

Figure 2:
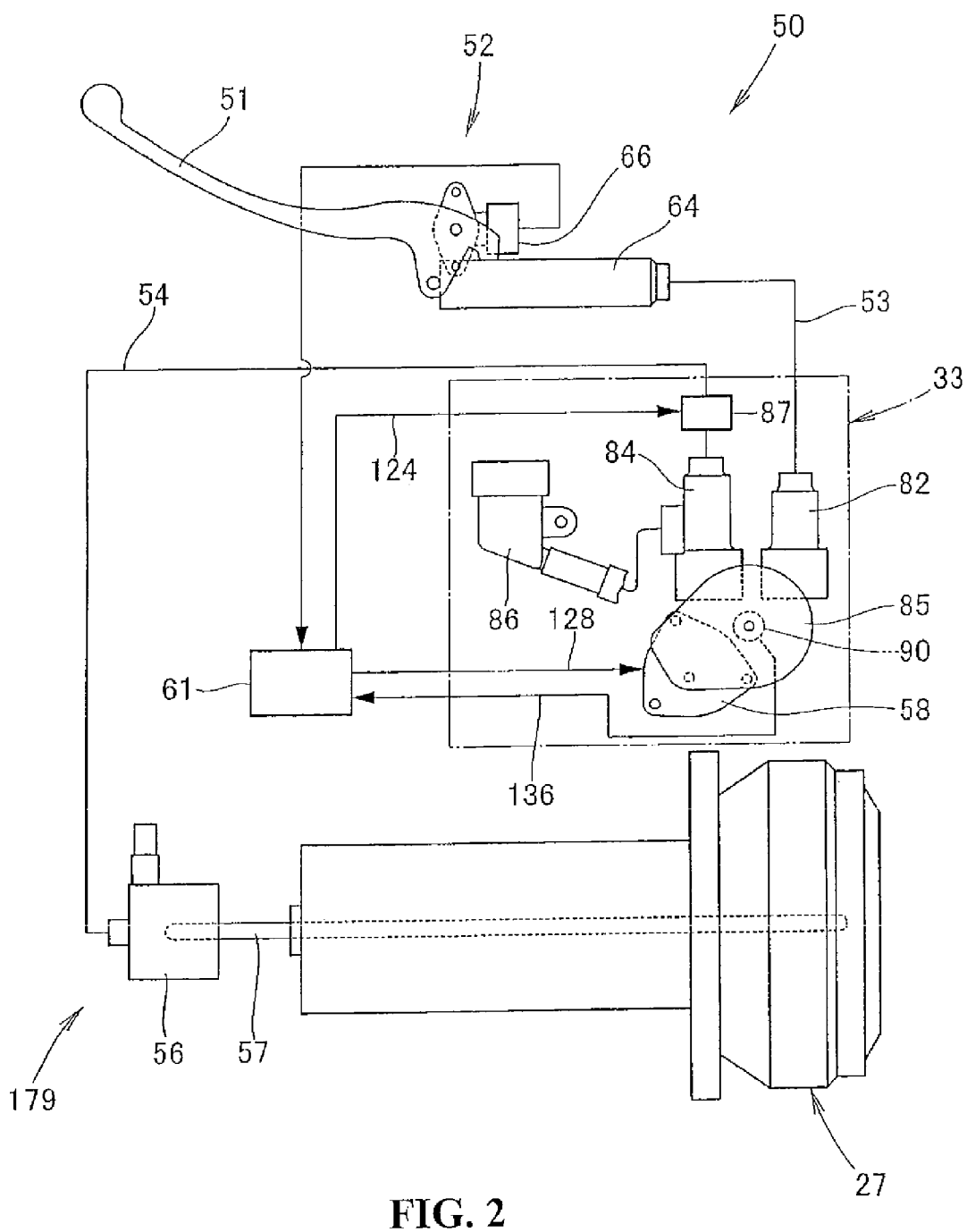
FIG. 2 is a system diagram illustrating the clutch operation mechanism (the first embodiment) according to the present invention.

FIG. 2 is a system diagram illustrating the clutch operation mechanism (a first embodiment) according to the invention. The clutch operation mechanism 50 includes a lever operating portion 52, an actuator unit 33, a second operating cylinder 56 (a first operating cylinder will be described later), a push rod 57 and a control section 61. The lever operating portion 52 includes the clutch lever 51 attached to the handlebar 21 (see FIG. 1). The actuator unit 33 is connected to the lever operating portion 52 via a hydraulic line 53. The second operating cylinder 56 is connected to the actuator unit 33 via a hydraulic line 54 (The first operating cylinder will be described later). The push rod 57 is interposed between the second operating cylinder 56 and the clutch 27. The control section 61 controls operation of a solenoid valve 87 (detailed later) serving as an opening and closing control valve provided in the middle of the hydraulic line 54 and an electric motor 58 provided in the actuator unit 33.

The second operating cylinder 56 above is connected to the clutch 27 via the push rod 57 to execute the disengaging and engaging operation of the clutch 27.

In the clutch operation mechanism 50, the clutch lever 51 is operated to allow the lever operating portion 52 to generate hydraulic pressure, which is transmitted to the second operating cylinder 56 via the actuator unit 33, thus manually disengaging and engaging the clutch 27 via the push rod 57.

In the clutch operation mechanism 50, without operation of the clutch lever 51, the electric motor 58 of the actuator unit 33 is actuated to generate hydraulic pressure, which is transmitted to the second operating cylinder 56, thus automatically disengaging and engaging the clutch 27 via the push rod 57.

Figure 3:
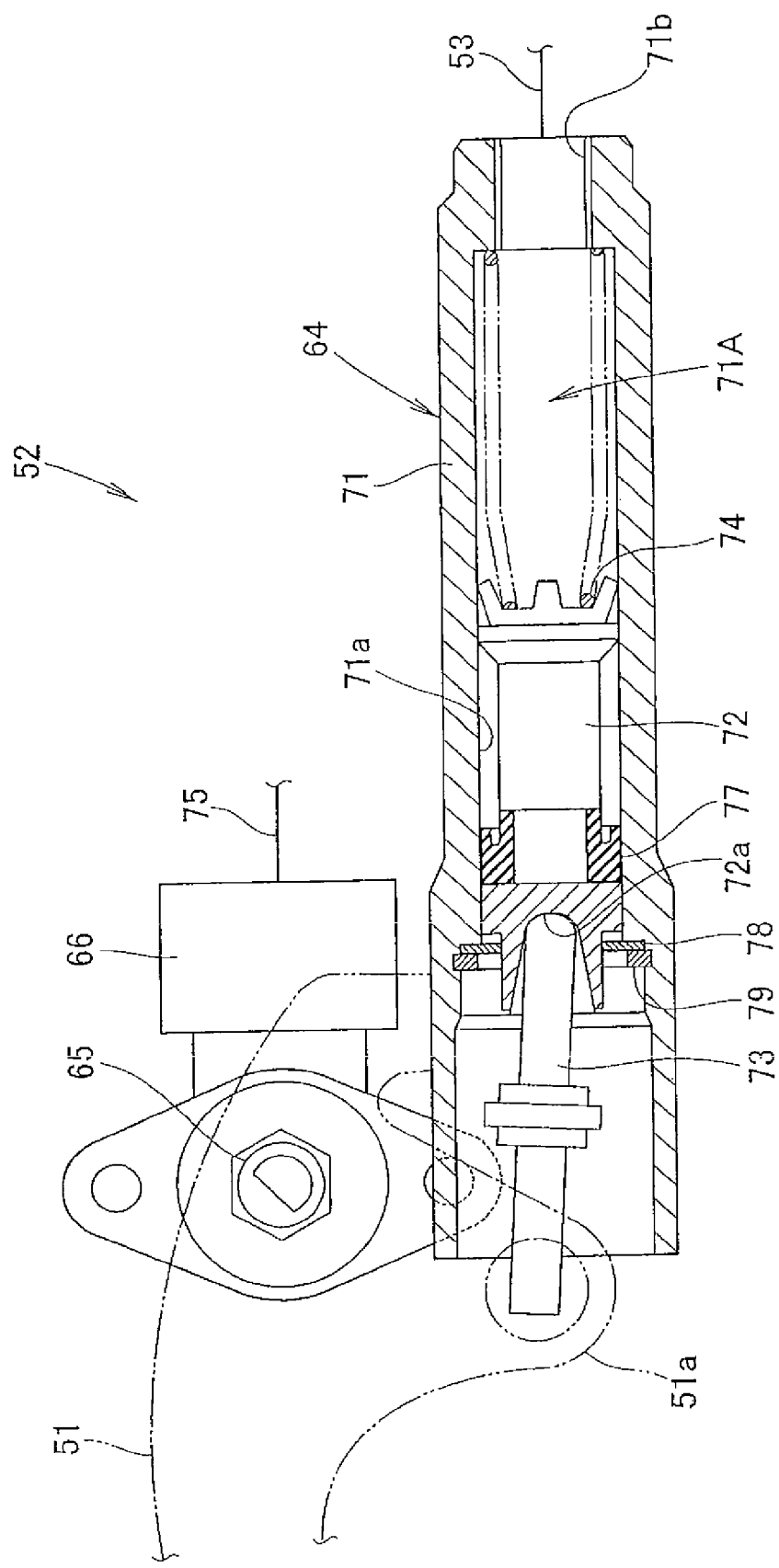
FIG. 3 is a cross-sectional view illustrating a lever operating portion of the clutch operation mechanism (the first embodiment) according to the present invention.

FIG. 3 is a cross-sectional view illustrating the lever operating portion of the clutch operating mechanism (the first embodiment) according to the present invention. The lever operating portion 52 includes the clutch lever 51, a first master cylinder 64 operated by the clutch lever 51 to generate hydraulic pressure and a lever turning angle sensor 66 attached to a swing shaft 65 of the clutch lever 51 to detect the swing angle of the clutch lever 51.

The first master cylinder 64 includes a tubular cylinder main body 71, a piston 72 movably inserted into a cylinder bore 71a formed in the cylinder main body 71, a rod 73 which is connected one end to an arm portion 51a of the clutch lever 51 and inserted the other end into a recessed portion 72a of the piston 72 in order to press the piston 72 and a spring 74 which presses the piston 72 toward the rod 73 with an elastic force. The hydraulic line 53 is connected to a line connection port 71b provided at an end of the cylinder main body 71.

A lever turning angle sensor 66 is connected to the control section 61 (see FIG. 2) via a lead 75.

In FIG. 3, a sealing member 77 is attached to the piston 72, a washer 78 is adapted to prevent the piston 72 from dropping out of the cylinder hole 71a, and a retaining ring 79 is provided for securing the washer 77 to the cylinder main body 71.

Figure 4:
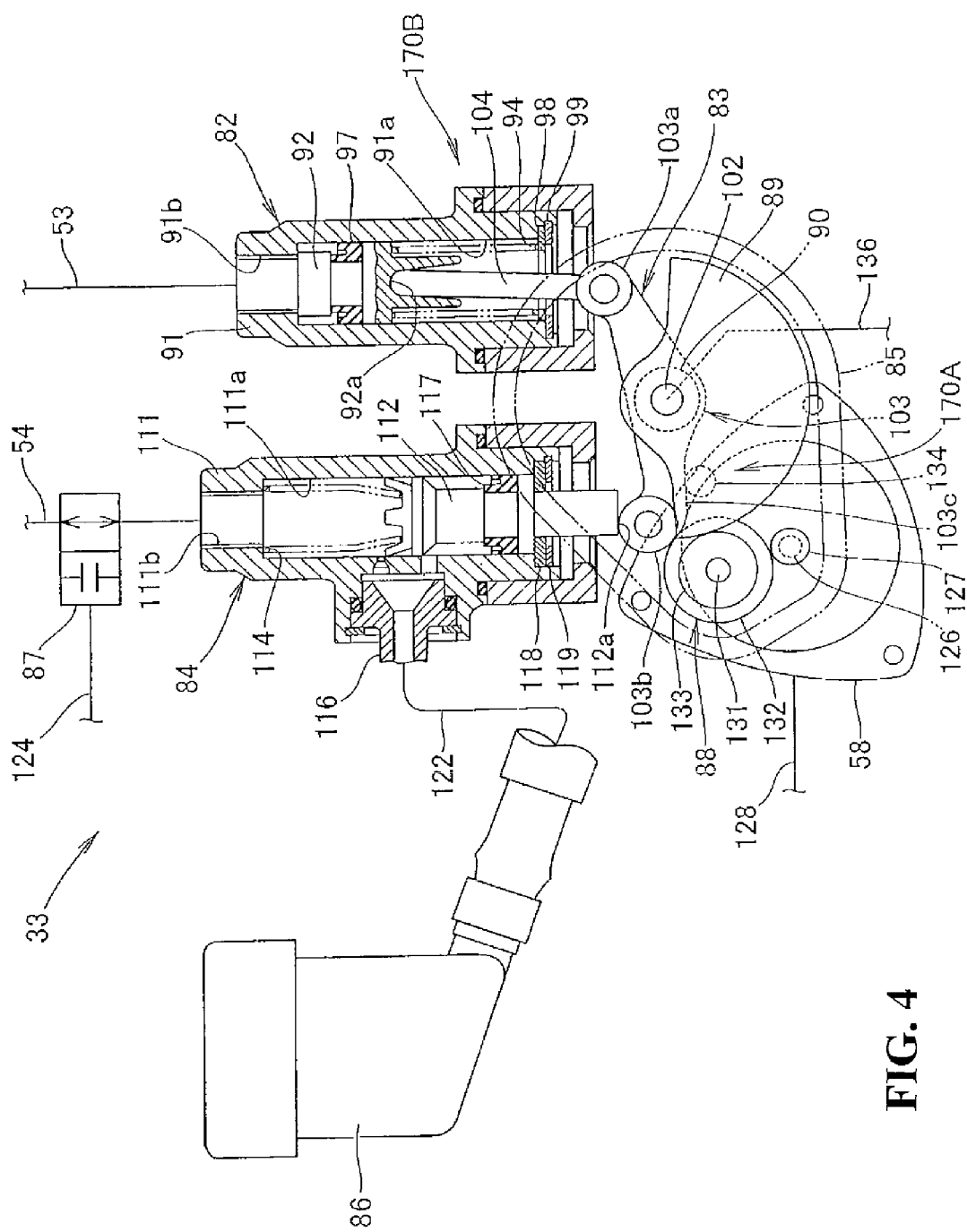
FIG. 4 is an explanatory view of an actuator unit of the clutch operation mechanism (the first embodiment) according to the present invention.

FIG. 4 is an explanatory view illustrating the actuator unit of the clutch operation mechanism (the first embodiment) according to the present invention. The actuator unit 33 includes a first operating cylinder 82 as a first pressing portion connected to the hydraulic line 53, a seesaw mechanism 83 operated by the hydraulic pressure generated by the first operating cylinder 82, a second master cylinder 84 operated by the seesaw mechanism 83 to generate hydraulic pressure and a reservoir tank 86 for storing therein working oil entering and leaving the inside of the second master cylinder 84. The actuator unit 33 further includes a solenoid valve 87 provided in the middle of the hydraulic line 54 to open or close the oil passage of the hydraulic line 54, an electric motor 58, a sectoral output gear 89 as a second pressing portion engaging with the electric motor 58 via a reduction gear 88, a gear case 85 for housing the gears therein and a crank turning angle sensor 90 attached to the gear case 85 to connect with the output gear 89 and detecting a turning angle.

The first operating cylinder 82 includes a tubular cylinder main body 91, a piston 92 movably inserted into a cylinder bore 91a formed in the cylinder main body 91 and a spring 94 for pressing the piston 92 toward the side opposite to the seesaw mechanism 83 with an elastic force. The hydraulic line 53 is connected to a line connection port 91b formed at an end of the cylinder main body 91. In addition, a sealing member 97 is attached to a piston 92 with a washer 98 adapted to support one end of the spring 94 and a retaining ring 99 securing the washer 97 to the cylinder main body 91.

The seesaw mechanism 83 includes a swing shaft 102 turnably supported by the gear case 85, a seesaw main body 103 as a turn-operating force transmitting member (and turn-pressing member) swung around the swing shaft 102 and a rod member 104 which is swingably connected to one end portion 103a of the seesaw main body 103 and has a leading end inserted into a recessed portion 92a formed in the piston 92.

The second master cylinder 84 is adapted to allow the second operating cylinder 56 (see FIG. 2) to generate hydraulic pressure via the hydraulic line 54. The second master cylinder 84 includes a tubular cylinder main body 111, a piston 112 movably inserted into a cylinder bore 111a formed in the cylinder main body 111, a spring 114 pressing the piston 112 toward the seesaw mechanism 83 with an elastic force and a tank side connection port 116 provided in the cylinder main body 111 to allow a cylinder bore 111a to communicate with the reservoir tank 86. The other end portion 103b of the seesaw main body 103 is pressed against an end face 112a of the piston 112. The hydraulic line 54 is connected to a line connection port 111b provided at the end of the cylinder main body 111. In addition, a sealing member 117 is attached to the piston 112 with a washer 118 adapted to prevent the piston 112 from dropping out of the cylinder bore 111a, a retaining ring 119 adapted to secure the washer 118 to the cylinder main body 111 and a line 122 connecting the tank side connection port 116 with the reservoir tank 86.

The solenoid valve 87 is connected to the control section 61 (see FIG. 2) via a provided in an intake passage of the engine are detected and a close-signal is sent from the control section 61 to the solenoid valve 87, the solenoid valve 87 closes. The working oil in the second operating cylinder 56 (see FIG. 2) cannot return to the second master cylinder 84 via the hydraulic line 54. Thus, the hydraulic pressure in the second operating cylinder 56 is maintained so that the disengagement or partial engagement of the clutch 27 (see FIG. 2) can be maintained during the parking of the vehicle.

The electric motor 58 has a rotating shaft 126 attached with a pinion 127 and its operation is controlled by the control section 61. In addition, a lead 128 is provided for connecting the electric motor 58 with the control section 61.

The reduction gear 88 is rotatably attached to a support shaft 131 and includes a large gear 132 meshing with the pinion 127 and a small gear 133 provided on the large gear 132 integrally therewith.

The output gear 89 is connected to the rotating shaft of the turning angle sensor 90 and meshes with the small gear 133 of the reduction gear 88. In addition, the output gear 89 is integrally attached to the swing shaft 102 of the seesaw main body 103 and is provided on the back surface with a crank pin 134 capable of pressing a rear surface 103c of the seesaw main body 103 close to the other end 103b thereof. The crank pin 134 and the rod member 104 are located opposite to each other with respect to the swing shaft 102.

The gear case 85 contains the seesaw main body 103, the rotating shaft 126 of the electric motor 58, the pinion 127, the reduction gear 88 and the output gear 89.

The crank turning angle sensor 90 detects the turning angle of the output gear 89 around the swing shaft 102, i.e., the turning angle of the crank pin 134 and outputs the crank pin 134 presses the piston 112 via the seesaw main body 103. In addition, a lead 136 is connecting the crank turning angle sensor 90 with the control section 61.

Figure 5:
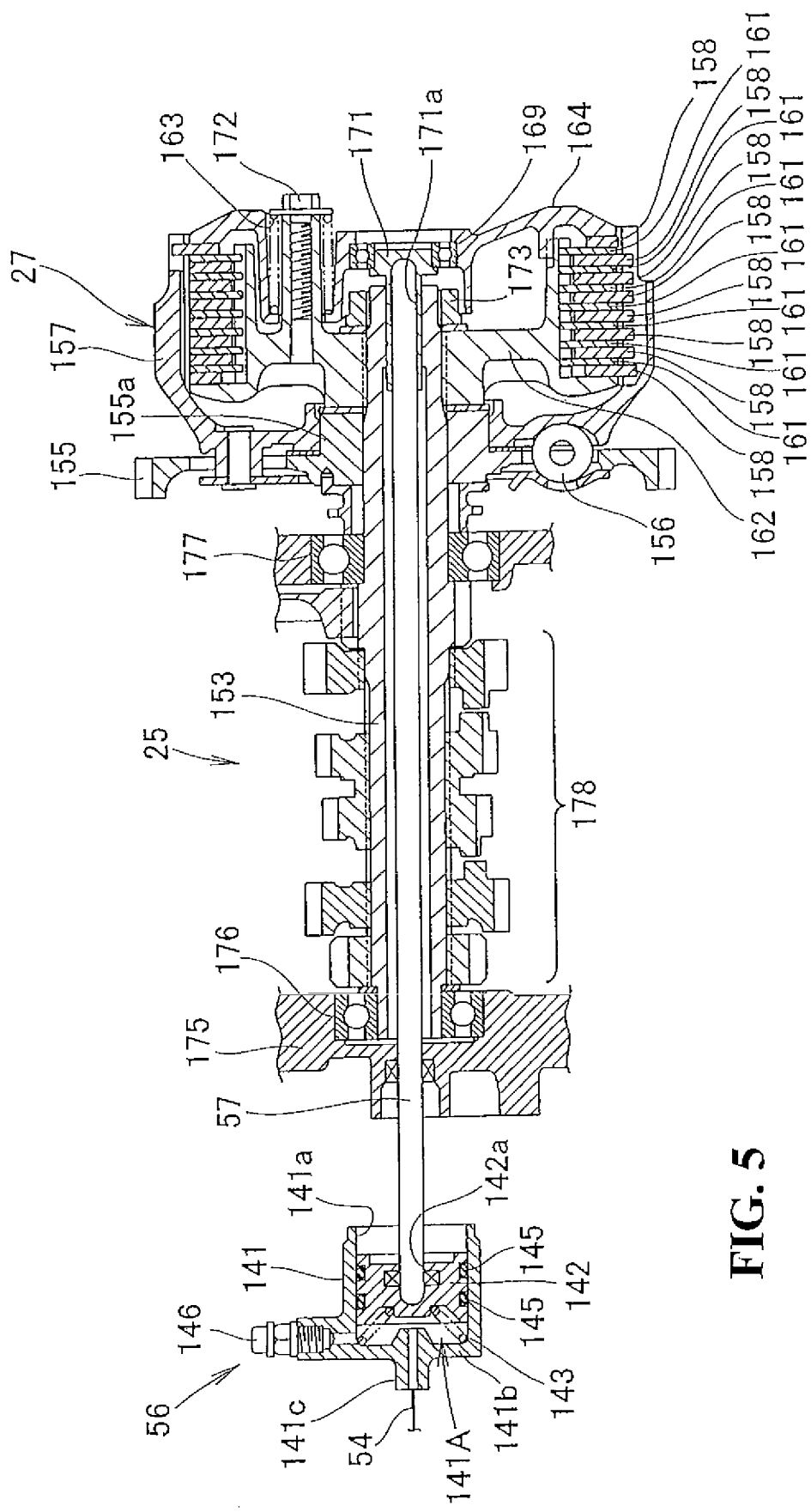
FIG. 5 is a cross-sectional view (the first embodiment) for assistance in explaining a second operating cylinder and a clutch of the clutch operation mechanism according to the present invention.

FIG. 5 is a cross-sectional view for assistance in explaining the clutch and the second operating cylinder of the clutch operation mechanism (the first embodiment) according to the present invention. The second operating cylinder 56 includes a bottomed-tubular cylinder main body 141, a piston 142 movably inserted into a cylinder bore 141a formed in the cylinder main body 141 and a spring 143 disposed between the piston 142 and a bottom wall 141b of the cylinder main body 141 to press the piston 142 toward the push rod 57. In addition, a line connection port 141c is provided in the bottom wall 141b of the cylinder main body 141 for connection with the hydraulic line 54. O-rings 145, 145 are attached to the piston 142 to seal between the cylinder bore 141a and the piston 142. An air-bleeding plug 146 is provided for bleeding air mixed in the working oil in the cylinder main body 141.

The piston 142 is formed with a rod inserting hole 142a adapted to receive one end of the push rod 57 inserted thereinto.

The clutch 27 is a multiple disk clutch which includes a large driven gear 155, a drive member 157, a plurality of clutch disks 158 which are friction disks, a plurality of clutch plates 161, a driven member 162, a pressing member 164 and an input member 171. The large driven gear 155 is rotatably carried by a main shaft 153 constituting part of the transmission 25 so as to mesh with a gear on the side of a crankshaft. The drive member 157 is mounted to the large driven gear 155 via coil springs 156. The clutch disks 158 are rotatably engaged with the inner circumferential surface of the drive member 157 so as to be movable in the axial direction of the main shaft 153. The clutch plates 161 are alternately superposed on the clutch disks 158. The driven member 162 is spline-connected to the main shaft 153 and the clutch plates 161 are engaged at the inner circumferential portions with the driven member 162 for rotation so as to be movable in the axial direction of the main shaft 153. The pressing member 164 is mounted to the driven member 162 via a plurality of coil springs 163 so as to press the driven member 162 via the clutch disks 158 and clutch plates 161. The input member 171 is disposed on the pressing member 164 via a bearing 169 and movably attached to the end of the main shaft 153. In addition, the input member 171 is formed with a rod insertion hole 171a adapted to receive the other end of the push rod 57 inserted thereinto. In addition, a plurality of bolts 172 are used to attach the coil springs 163 to the driven member 162 with the coil springs 163 being provided to press the pressing member 164 to the driven member 162. A nut 173 is used to attach the driven member 162 to the main shaft 153.

The transmission 25 is such that the main shaft 153 is rotatably carried by the housing 175 via bearings 176, 177 and the counter shaft not shown is rotatably carried by the housing 175 via a pair of bearings.

A drive gear train 178 composed of a plurality of drive gears is spline-connected onto the main shaft 153 so as to be axially movable. A driven gear train composed of a plurality of driven gears is spline-connected onto the counter shaft. The gears of the driven gear train are each engaged with a corresponding one of the gears of the drive gear train 178. Gears are selected by a shift mechanism not shown for power transmission.

As illustrated in FIG. 2, the second master cylinder 84, the second operation cylinder 56 and the hydraulic line 54 are components constituting a clutch disengaging and engaging portion 179 which disengages and engages the clutch.

A description is next made of the operation of the clutch operation mechanism 50 described above.

To manually disengage and engage the clutch 27 (see FIG. 2), in FIG. 3, the clutch lever 51 is operated to press the rod 73 against the piston 72, which is moved in the cylinder bore 71a toward the line connection port 71b against the elastic force of the spring 74. Thus, the hydraulic pressure in an oil chamber 71A in the cylinder bore 71a is increased.

Figure 6:
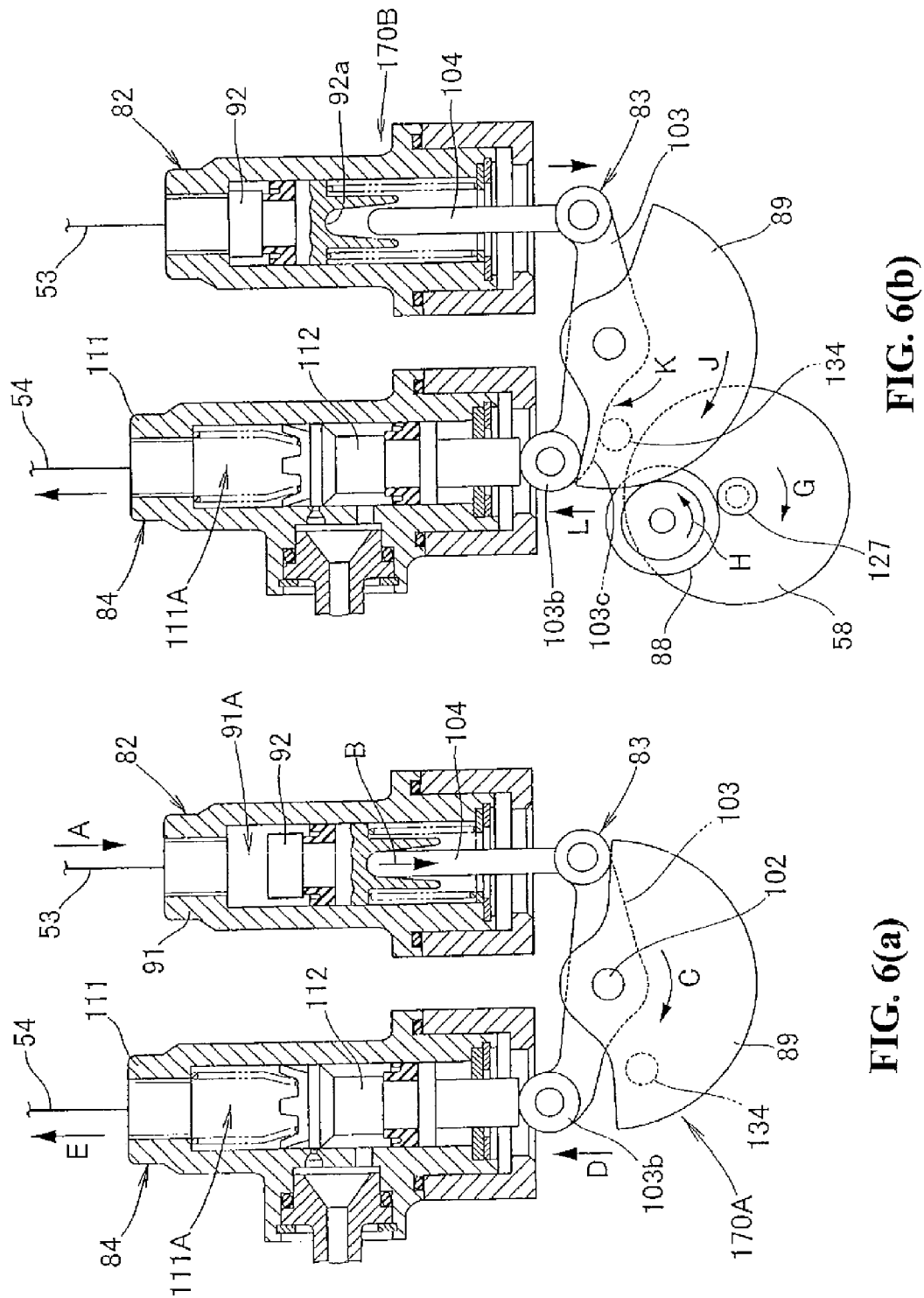
FIGS. 6(a) and 6(b) are operational views (the first embodiment) illustrating the operation of the actuator unit according to the present invention.

FIGS. 6(a) and 6(b) are operational views (the first embodiment) illustrating the operation of the actuator unit according to the present invention.

In FIG. 6(a), when the increased hydraulic pressure of the master cylinder 64 (see FIG. 3) is transmitted to the first operating cylinder 82 in the direction of the arrow A via the hydraulic line 53, the hydraulic pressure in an oil chamber 91A in the cylinder main body 91 is increased. This increased hydraulic pressure moves the piston 92 to press the rod member 104 of the seesaw mechanism 83 in the direction of arrow B. This swings the seesaw main body 103 around the swing shaft 102 in the direction of arrow C, whereby the other end portion 103b presses the piston 112 of the second master cylinder 84 in the direction of arrow D.

The piston 112 thus pressed and increases the hydraulic pressure in an oil chamber 111A in the cylinder main body 111. This increased hydraulic pressure is transmitted as indicated with arrow E via the hydraulic line 54 to an oil chamber 141A in the cylinder main body 141 of the second operating cylinder 56 to increase the hydraulic pressure in the oil chamber 141A. Thus, the piston 142 presses the push rod 57, which is moved toward the clutch 27.

As a result, the pressing member 164 is separated from the clutch disk 158 via the bearing 169 to approximately lose the pressing force adapted to press the clutch disks 158 to the clutch plates 161, thereby, disengaging the clutch 27. In other words, power is not transmitted from the drive member 157 to the driven member 162.

In this case, since the electric motor 58 (see FIG. 4) is not operated, the output gear 89 shown in FIG. 6(a) is stationary. The seesaw main body 103 is spaced apart from the crank pin 134 of the output gear 89. Thus, the operation of the clutch lever 51 (see FIG. 2) does not affect the electric motor 58 and the associated parts thereof.

The crank pin 134 and seesaw main body 103 are component parts constituting a motor side lost mechanism 170A as a second lost mechanism that interrupts, from the side of the electric motor 58, the operated-force applied from the seesaw main body 103 due to the operation of the clutch lever 51 when the electric motor 58 is not operated.

In FIG. 6(b), to automatically disengage and engage the clutch 27 (see FIG. 2), the electric motor 58 is actuated to transmit the rotation of the pinion 127 in the direction of arrow G to the output gear 89 (the rotation in the direction of arrow J) via the reduction gear 88 (the rotation in the direction of arrow H).

When the output shaft 89 is rotated in the direction of arrow J, the crank pin 134 of the output gear 89 presses the rear surface 103c of the seesaw main body 103 in the direction of arrow K. The other end portion 103b of the seesaw main body 103 presses the piston 112 of the second master cylinder 84 as indicated with arrow L, which increases the hydraulic pressure of the oil chamber 111A of the cylinder main body 111. Thus, the clutch 27 is disengaged in the same way as that described with reference to FIG. 6(a).

In this case, the piston 92 of the first operating cylinder 82 is stationary and the rod member 104 of the seesaw mechanism 83 is separated from the recessed portion 92a of the piston 92. Thus, the operation of the electric motor 58 does not affect the clutch lever 51 (see FIG. 2) and the associated parts thereof.

The piston 92 and rod member 104 described above are component parts that are disposed between the clutch lever 51 and the seesaw main body 103 and constitute a lever side lost mechanism 170B as a first lost mechanism that interrupts, from the side of clutch lever 51, the operated-force applied from the rod member 104 due to the driving of the electric motor 58 when the clutch lever 51 is not operated.

Figure 7:
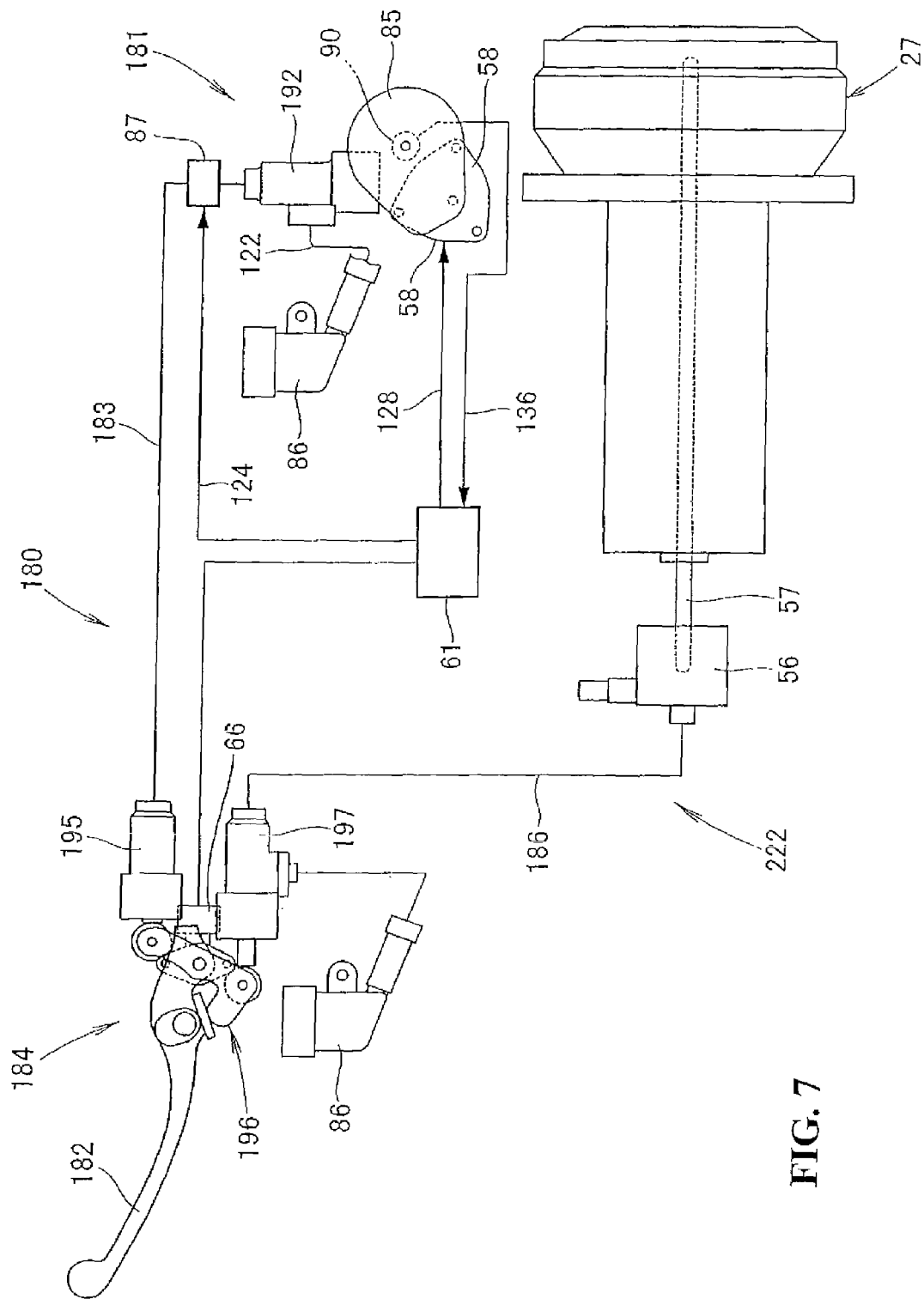
FIG. 7 is a system diagram illustrating a clutch operation mechanism (a second embodiment) according to the present invention.

FIG. 7 is a system diagram illustrating a clutch operation mechanism (a second embodiment) according to the present invention. The same configurations as those in the first embodiment shown in FIG. 2 are indicated with like reference numerals and their detailed explanations are omitted.

A clutch operation mechanism 180 includes an actuator unit 181, a lever operating portion 184, a second operating cylinder 56, a push rod 57 and a control section 61. The actuator unit 181 generates hydraulic pressure by operating an electric motor 58. The lever operating portion 184 includes a clutch lever 182 and serves as a clutch operating unit connected to the actuator unit 181 via a hydraulic line 183. A second operating cylinder 56 is connected to the lever operating portion 184 via a hydraulic line 186. The control section 61 controls the operation of an electric motor 58 and a solenoid valve 87.

The lever operating portion 184 above is located close to the clutch lever 182.

In the clutch operating mechanism 180 described above, the clutch lever 182 is operated to generate hydraulic pressure in the lever operating portion 184. In addition, the hydraulic pressure thus generated is transmitted to the second operating cylinder 56 to manually disengage and engage the clutch 27 via the push rod 57.

Also in the clutch operating mechanism 180, without operating the clutch lever 182, the electric motor 58 of the actuator unit 181 is actuated to generate hydraulic pressure, which is transmitted via the lever operating portion 184 to the second operating cylinder 56 to automatically disengage and engage the clutch 27 via the push rod 57.

Figure 8:
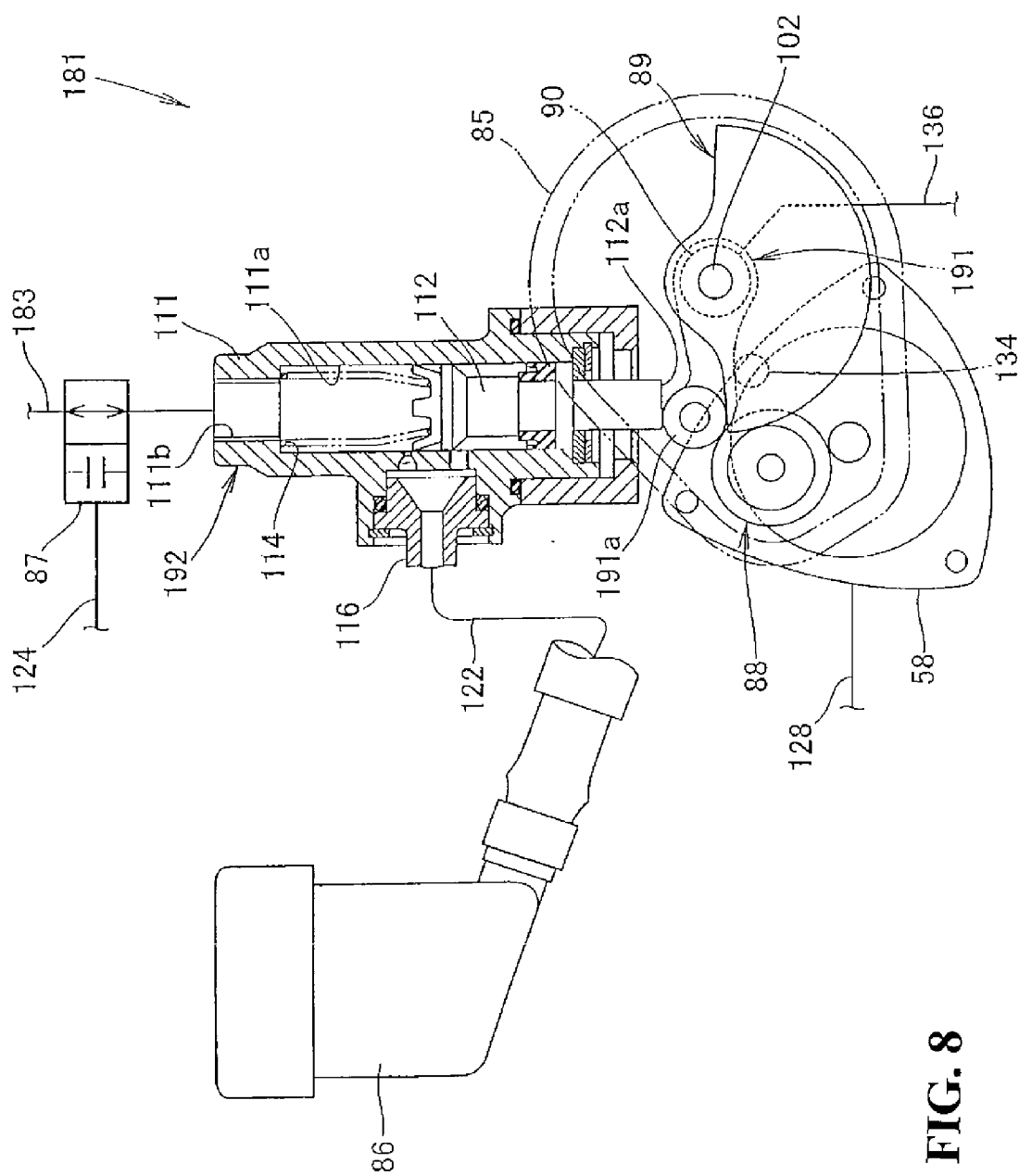
FIG. 8 is an explanatory view of an actuator unit of the clutch operation mechanism (the second embodiment) according to the present invention.

FIG. 8 is an explanatory view illustrating the actuator unit of the clutch operation mechanism (the second embodiment) according to the present invention. The actuator unit 181 includes the electric motor 58, an output gear 89 engaging with the electric motor 58 via a reduction gear 88, a gear case 85 housing the gears, a crank turning angle sensor 90 and an arm member 191 pivotally attached to a swing shaft 102 so as to be pushed out by a crank pin 134 of the output gear 89. The actuator unit 181 further includes a first master cylinder 192 that generates hydraulic pressure by the swing of the arm member 191, a reservoir tank 86 for storing therein working oil entering and leaving the inside of the first master cylinder 192 and a solenoid valve 87 provided on the middle of a hydraulic line 183 to open and close the oil passage of the hydraulic line 183 connected to the first master cylinder 192.

The first master cylinder 192 has the same structure as that of the second master cylinder 84 of the first embodiment shown in FIG. 4. In addition, the first master cylinder 192 includes a tubular cylinder main body 111, a piston 112 movably inserted into a cylinder bore 111a, a spring 114 and a tank side connection port 116. An end 191a of the arm member 191 is pressed against an end face 112a of the piston 112. The hydraulic line 183 is connected to a line connection port 111b provided at the end of the cylinder main body 111.

Figure 9:
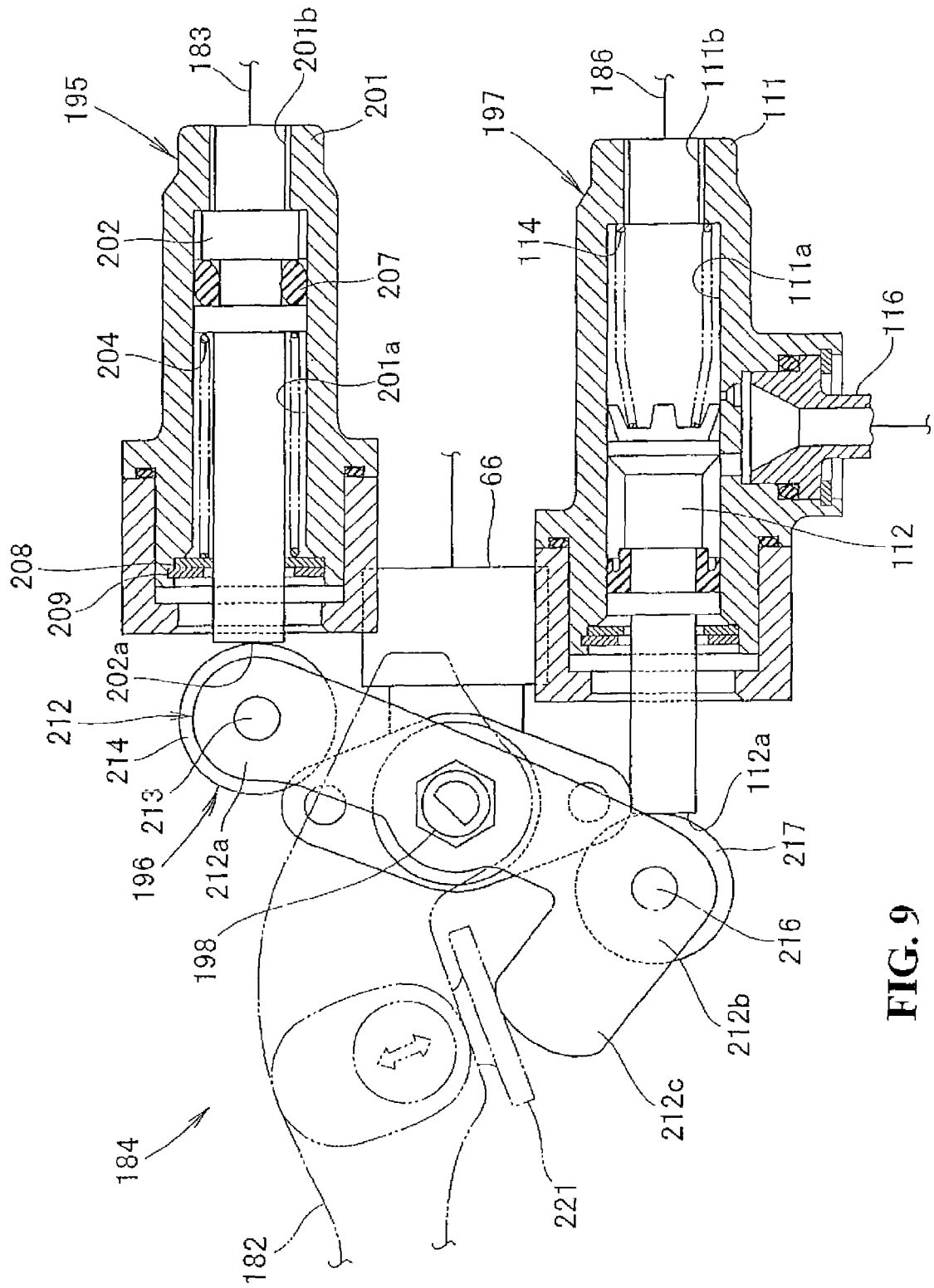
FIG. 9 is an explanatory view of a lever operating portion of the clutch operation mechanism (the second embodiment) according to the present invention.

FIG. 9 is an explanatory diagram illustrating the lever operating portion of the clutch operation mechanism (the second embodiment). The lever operating portion 184 includes a first operating cylinder 195 as a second pressing portion, a seesaw mechanism 196, a second master cylinder 197, the reservoir tank 86 (see FIG. 7), a clutch lever 182 and a lever turning angle sensor 66. The first operating cylinder 195 is located close to the clutch lever 182 and is connected to the actuator unit 181 (see FIG. 8) via the hydraulic line 183. The seesaw mechanism 196 is operated by the hydraulic pressure generated by the first operating cylinder 195. The second master cylinder 197 generates hydraulic pressure by the operation of the seesaw mechanism 196. The reservoir tank 86 stores therein working oil entering and leaving the inside of the second master cylinder 197. The clutch lever 182 is attached to a swing shaft 198 turnably supported by the handlebar 21 (see FIG. 1). The lever turning angle sensor 66 has a detection shaft connected to the swing shaft 198 to the swing angle of the clutch lever 182 to detect the swing angle of the clutch lever 182.

The first operating cylinder 195 includes a tubular cylinder main body 201, a piston 202 movably inserted into a cylinder bore 201a formed in the cylinder main body 201 and a spring 204 pressing elastically the piston 202 toward the side opposite to the seesaw mechanism 196. The hydraulic line 183 is connected to a line connection port 201b formed at the other end of the cylinder main body 201. In addition, a sealing member 207 is attached to the piston 202 with a washer 208 adapted to support one end of the spring 204, and a retaining ring 209 securing the washer 208 to the cylinder main body 201.

The seesaw mechanism 196 includes a swing shaft 198, a seesaw main body 212 as a turn-operating force transmitting member (and a turn-pressing member), a first roller 214 and a second roller 217. The seesaw main body 212 swings around the swing shaft 198. The first roller 214 is turnably attached to one end portion 212a of the seesaw main body 212 via a support shaft 213 so as to be brought into abutment against an end face 202a of the piston 202. The second roller 217 is turnably attached to the other end portion 212b of the seesaw main body 212 via a support shaft 216 so as to be brought into abutment against an end face 112a of the piston 112 of the second master cylinder 197.

The second master cylinder 197 allows the second operating cylinder 56 (see FIG. 7) to generate hydraulic pressure via the hydraulic line 186 and has the same structure as that of the first master cylinder 192 (see FIG. 8). The second master cylinder 197 includes a cylinder main body 111, a piston 112 movably inserted into a cylinder bore 111a, a spring 114 and a tank side connection port 116. The hydraulic line 186 is connected to the line connection port 111b provided at the end of the cylinder main body 111.

A clutch lever 182 is provided with an adjust screw 221 which is abutted against an end projecting portion 212c as a first pressing portion to adjust the lever angle of the clutch lever 182. The end projecting portion 212c is formed integrally with the seesaw main body 212.

Returning to FIG. 7, the second master cylinder 197, the second operating cylinder 56 and the hydraulic line 186 are component parts constituting a clutch disengaging and engaging portion 222 for disengaging and engaging the clutch 27.

A description is next made of the operation of the clutch operation mechanism 180 described above.

Figure 10:
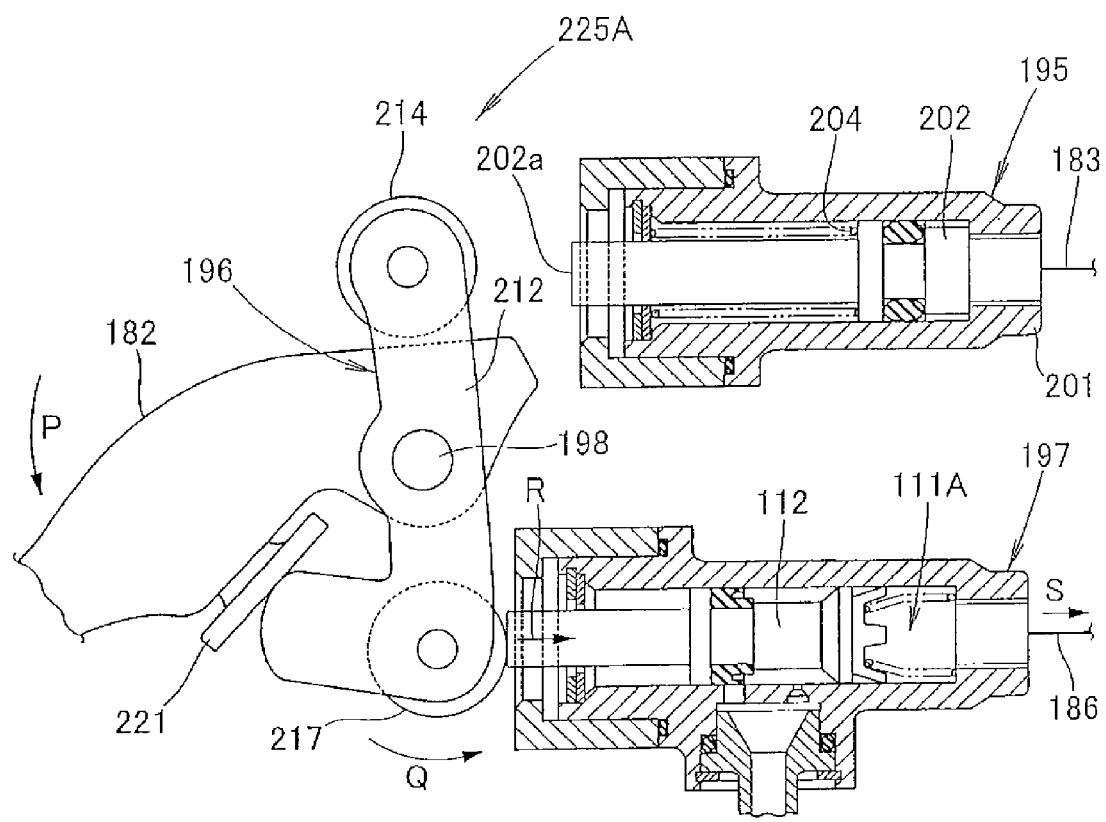
FIG. 10 is a first operational view illustrating the operation of the clutch operation mechanism (the second embodiment) according to the present invention.

FIG. 10 is a first operational view illustrating the operation of the clutch operation mechanism (the second embodiment) according to the present invention.

To manually disengage and engage the clutch 27 (see FIG. 7), the clutch lever 182 is operated in the direction of arrow P. This swings the seesaw mechanism 196 in the direction of arrow Q via the adjust screw 221. The second roller 217 of the seesaw mechanism 196 presses the piston 112 of the second master cylinder 197 in the direction of arrow R to increase the hydraulic pressure of an oil chamber 111A in the second master cylinder 197. This hydraulic pressure is transmitted to the second operating cylinder 56 (see FIG. 7) in the direction of arrow S via the hydraulic line 186. Thus, the clutch 27 is disengaged as described above.

The piston 202 of the first operating cylinder 195 and the first roller 214 of the seesaw mechanism 196 described above are component parts that are disposed between the electric motor 58 (see FIG. 9) and the seesaw main body 212 and constitute a motor side lost mechanism 225A as a second lost mechanism that interrupts the operated-force applied from the seesaw main body 212 due to the operation of the clutch lever 182 when the electric motor 58 is not operated.

Figures 11A, 11B:
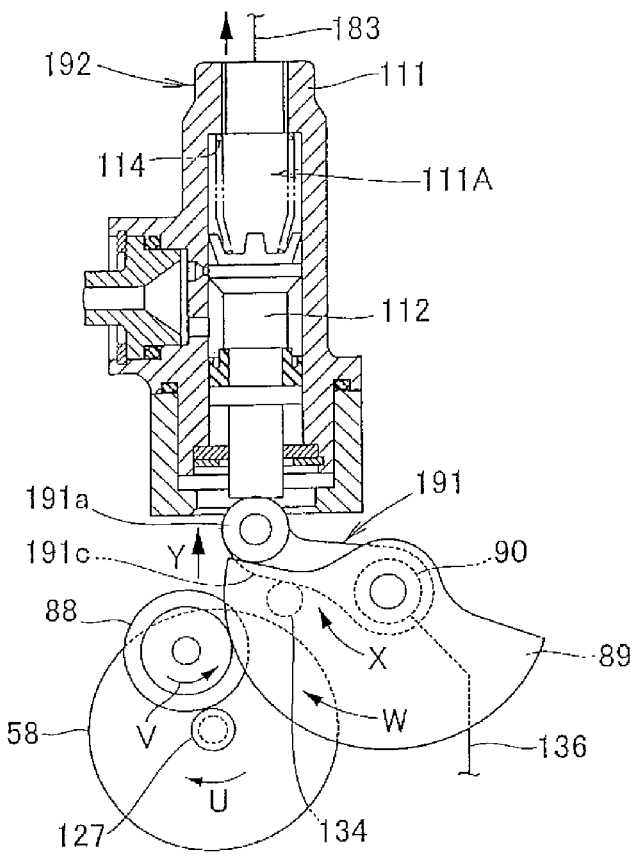
FIGS. 11(a) and 11(b) are second operational views illustrating the operation of the clutch operation mechanism (the second embodiment) according to the present invention.

FIGS. 11(a) and 11(b) illustrate the operation of the clutch operation mechanism (the second embodiment) according to the present invention.

In FIG. 11(a), to automatically disengage and engage the clutch 27 (see FIG. 7), the electric motor 58 is actuated to transmit the rotation of a pinion 127 in the direction of arrow U to the output gear 89 (the rotation in the direction of arrow W) via a reduction gear 88 (the rotation in the direction of arrow V).

When the output shaft 89 is rotated as indicated with arrow W, a crank pin 134 of the output shaft 89 presses the rear surface 191c of the arm member 191 as indicated with arrow X. The end 191a of the arm member 191 presses the piston 112 of the first master cylinder 192 in the direction of arrow Y to increase the hydraulic pressure in the oil chamber 111A of the cylinder main body 111.

In FIG. 11(b), the increased hydraulic pressure in the first master cylinder 192 (see FIG. 11(a)) is transmitted to the first operating cylinder 195 as indicated with arrow a via the hydraulic line 183 to increase the hydraulic pressure in an oil chamber 201A in the cylinder main body 201.

Consequently, the piston 202 is moved to press the first roller 214 of the seesaw mechanism 196 in the direction of arrow b, which swings the seesaw mechanism 196 in the direction of arrow c. The second roller 217 presses the piston 112 of the second master cylinder 197 in the direction of arrow d to increase the hydraulic pressure of the oil chamber 111A in the second master cylinder 197. The hydraulic pressure thus increased is transmitted in the direction of arrow e to the second operating cylinder 56 (see FIG. 7) via the hydraulic line 186. Thus, the clutch 27 is disengaged as described above.

The adjust screw 221 and the end projecting portion 212c of the seesaw mechanism 196 described above are component parts that are provided at a portion of the seesaw main body 212 so as to be adjacent to the clutch lever 182 and constitute a lever side lost mechanism 225B as a first lost mechanism that interrupts the operated-force applied from the seesaw main body 212 due to the driving of the electric motor 58 when the clutch lever 182 is not operated.

Figure 12:
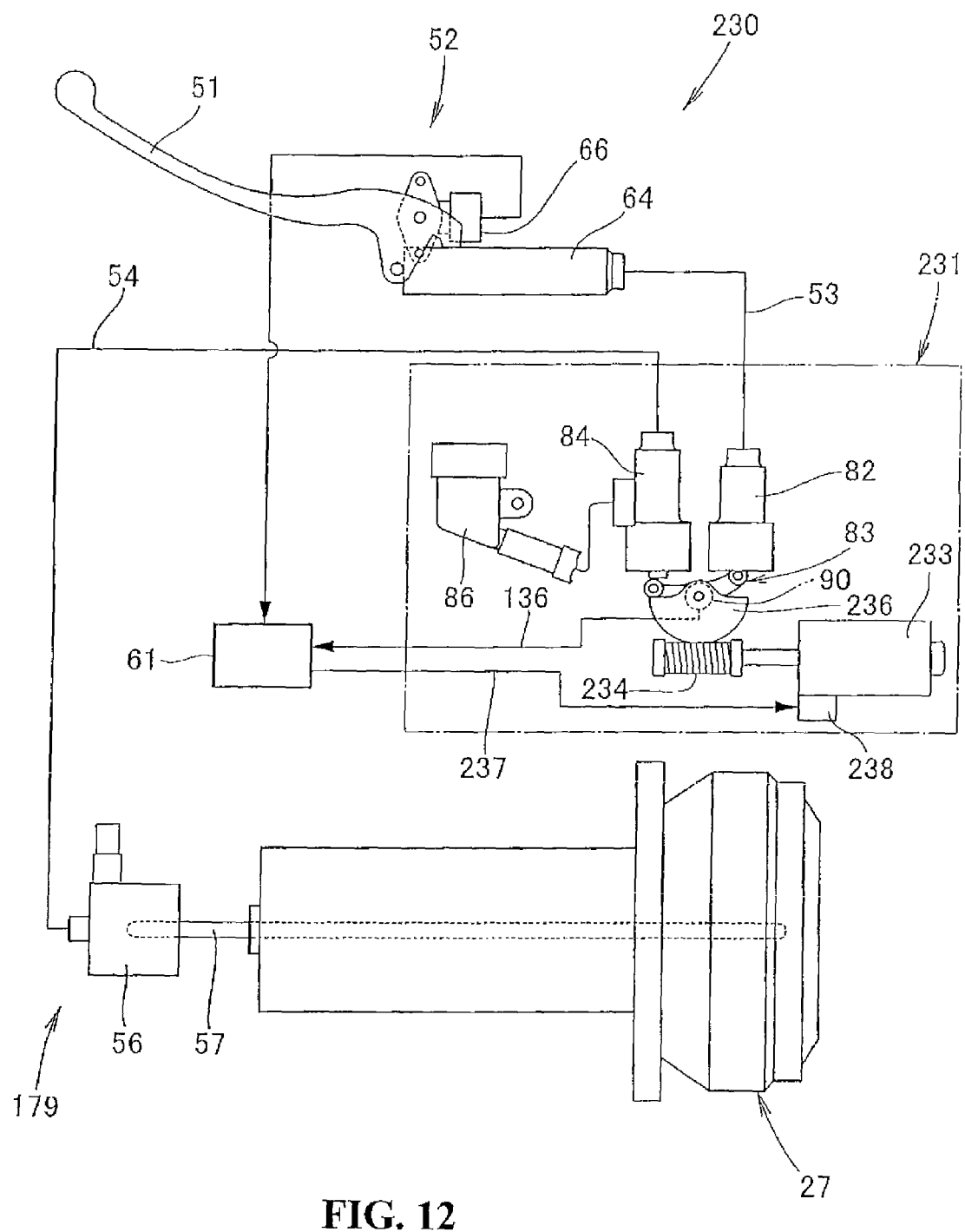
FIG. 12 is a system view illustrating a clutch operation mechanism (a third embodiment) according to the present invention.

FIG. 12 is a system diagram illustrating a clutch operation mechanism (a third embodiment) according to the present invention. The same configurations as those in the first embodiment shown in FIG. 2 are indicated with like reference numerals and their detailed explanations are omitted.

The clutch operation mechanism 230 includes a lever operating portion 52, an actuator unit 231, a second operating cylinder 56, a push rod 57 and a control section 61. The lever operating portion 52 includes a clutch lever 51 provided on the handlebar 21 (see FIG. 1). The actuator unit 231 serves as a clutch operating unit connected to the lever operating portion 52 via a hydraulic line 53. The second operating cylinder 56 is connected to the actuator unit 231 via a hydraulic line 54. The push rod 57 is disposed between the second operating cylinder 56 and the clutch 27. The control section 61 controls the operation of an electric motor 233 provided in the actuator unit 231.

Figure 13:
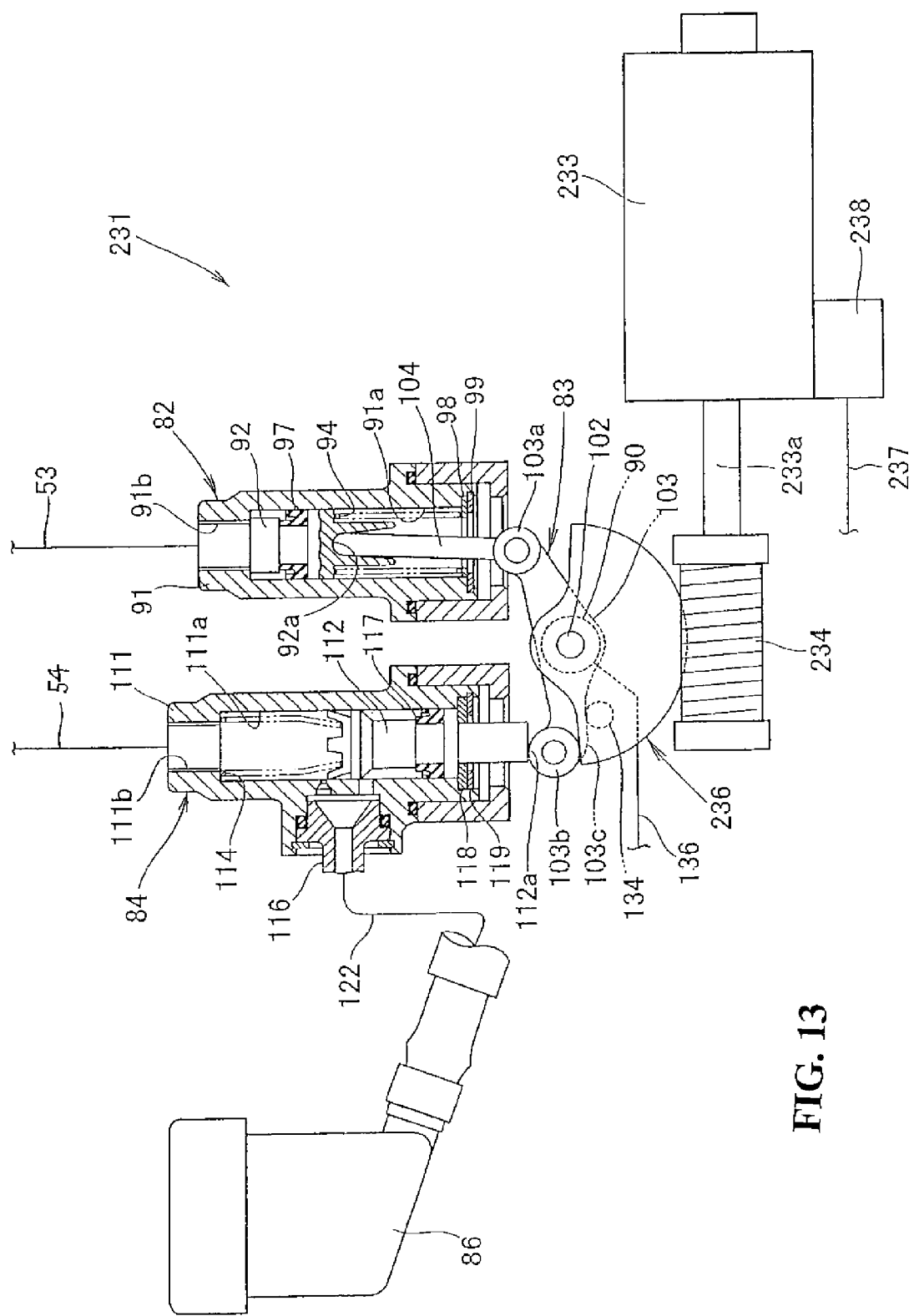
FIG. 13 is an explanatory view illustrating an actuator unit of the clutch operation mechanism (the third embodiment) according to the present invention.

FIG. 13 is an explanatory view illustrating the actuator unit of the clutch operation mechanism (the third embodiment) according to the present invention. The same configurations as those in the first embodiment shown in FIG. 4 are indicated with like reference numerals and their detailed explanations are omitted.

The actuator unit 231 includes a first operating cylinder 82, a seesaw mechanism 83, a second master cylinder 84, a reservoir tank 86, an electric motor 233, a worm 234 carried on a rotating shaft 233a of the electric motor 233, a sectoral worm wheel 236 meshing with the worm 234 and a crank turning angle sensor 90 for detecting the turning angle of the worm wheel 236.

The electric motor 233 is attached with a motor drive control section 238 connected to the control section 61 via a lead 237. The control section 61 sends a motor drive signal to the motor drive control section 238 for controlling the operation of the electric motor 233.

The worm wheel 236 is integrally attached to a swing shaft 102 of the seesaw main body 103 and is provided on a rear surface with a crank pin 134 capable of pressing a rear surface 103c of the seesaw main body 103 close to the other end portion 103b thereof.

The crank turning angle sensor 90 detects the turning angle of the worm wheel 236 around the swing shaft 102, i.e., the turning angle of a crank pin 134 and outputs it to the control section 61.

Figure 14:
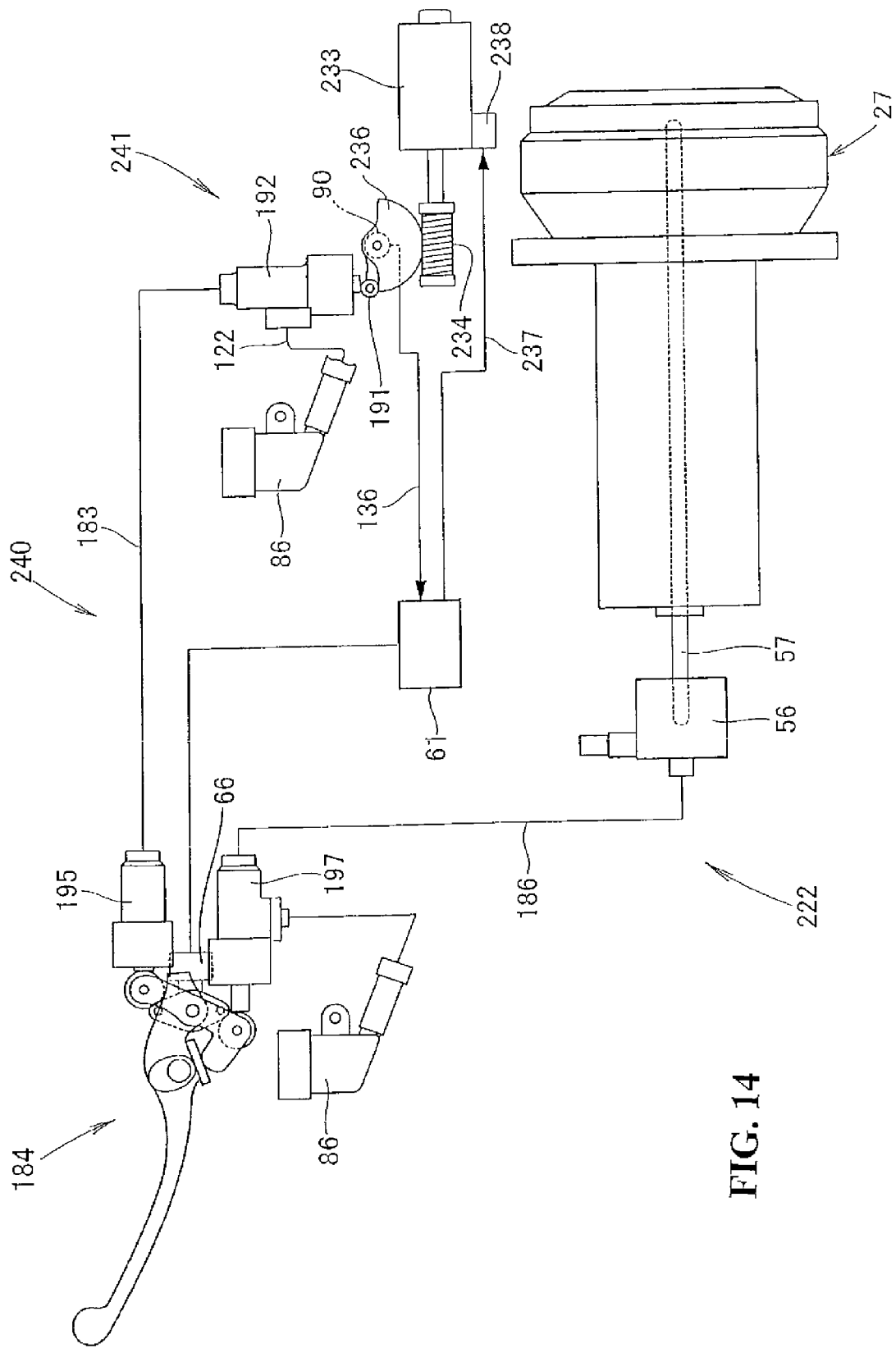
FIG. 14 is a system view illustrating a clutch operation mechanism (a fourth embodiment) according to the present invention.

FIG. 14 is a system diagram illustrating a clutch operation mechanism (a fourth embodiment) according to the present invention. The same configurations as those in the second embodiment shown in FIG. 7 are indicated with like reference numerals and their detailed explanations are omitted.

A clutch operation mechanism 240 includes an actuator unit 241 for generating hydraulic pressure by operating the electric motor 233, a lever operating portion 184, a second operating cylinder 56 connected to the lever operating portion 184 via a hydraulic line 186, a push rod 57, an electric motor 233 and a control section 61.

Figure 15:
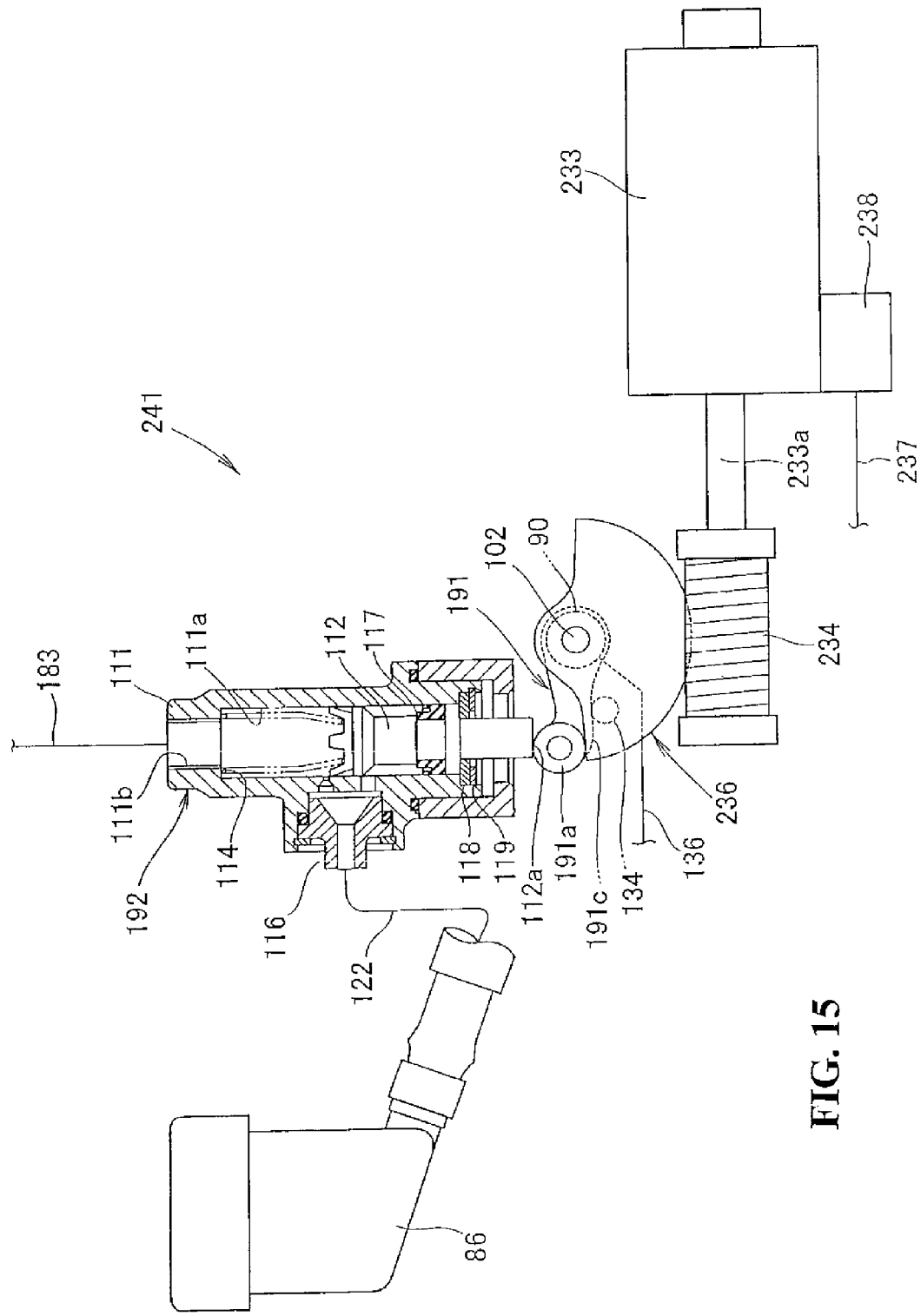
FIG. 15 is an explanatory view illustrating an actuator unit of the clutch operation mechanism (the fourth embodiment) according to the present invention.

FIG. 15 is an explanatory view illustrating the actuator unit of the clutch operation mechanism (the fourth embodiment) according to the present invention. The same configurations as those in the second and third embodiments shown in FIGS. 8 and 13 are indicated with like reference numerals and their detailed explanations are omitted.

The actuator unit 241 includes an electric motor 233, a worm 234 carried on a rotating shaft 233a of the electric motor 233 and a sectoral worm wheel 236 meshing with the worm 234. The actuator unit 241 further includes a crank turning angle sensor 90 for detecting the turning angle of the worm wheel 236, an arm member 191 turnably attached to a swing shaft 102 so as to be pressed out by a crank pin 134 of the worm wheel 236, a first master cylinder 192 for generating hydraulic pressure by the swing of the arm member 191 and a reservoir tank 86 for storing working oil entering and leaving the inside of the first master cylinder 192.

In addition, in the respective embodiments shown in FIGS. 8 and 15, the piston 112 is pressed out by the crank pin 134 via the arm member 191. However, the invention is not limited to these embodiments and the piston 112 may directly be pressed out by the crank pin 134.

The clutch operation mechanism of the present invention is suitable for motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A clutch operation mechanism comprising:
a clutch disengaging and engaging portion having a mechanism for disengaging and engaging a clutch;

a clutch lever adapted to manually apply an operating force to the clutch disengaging and engaging portion;

an electric motor capable of automatically applying a drive force to the clutch disengaging and engaging portion;

a turn-operating force transmitting member which turns in linkage with operation of the clutch lever to enable transmission of an operating force to the clutch disengaging and engaging portion or with driving of the electric motor to enable transmission of a drive force to the clutch disengaging and engaging portion;

a first lost mechanism which is located between the clutch lever and the turn-operating force transmitting member to interrupt, from the clutch lever side, an operated-force applied from the turn-operating force transmitting member due to the driving of the electric motor when the clutch lever is not operated; and a second lost mechanism which is located between the electric motor and the turn-operating force transmitting member to interrupt, from the electric motor side, an operated-force applied from the turning operating force transmitting member due to the operation of the clutch lever when the electric motor is not operated, wherein the clutch disengaging and engaging portion includes:

an operating cylinder connected to the clutch to perform disengaging and engaging operation of the clutch;

a master cylinder for allowing the operating cylinder to generate hydraulic pressure;

a hydraulic line for connecting the operating cylinder with the master cylinder respectively; and an opening and closing control valve is provided on the hydraulic line.

2. A clutch operation mechanism comprising:

an operating cylinder connected to a clutch to perform disengaging and engaging operation of the clutch;

a master cylinder generating a hydraulic pressure in the operating cylinder;

a hydraulic line for connecting the operating cylinder with the master cylinder respectively, a clutch lever for manually operating the disengagement and engagement of the clutch; and an electric motor for generating a drive force adapted to enable automatic disengagement and engagement of the clutch not by the manual operation;

a first pressing portion for converting the clutch lever operating force into a pressing force;

a second pressing portion for converting the electric motor drive force into a pressing force; and a turn-pressing member turned by being pressed by the first or second pressing portion to apply a pressing force to the master cylinder;

wherein the first and second pressing portions are located at respective positions capable of turning the turn-pressing member in the same direction and opposite to the to a turning center of the turn-pressing member, wherein an opening and closing control valve is provided on the hydraulic line.

3. The clutch operation mechanism according to claim 2, further comprising a clutch operation unit including the master cylinder, the first pressing portion, the second pressing portion, and the turn-pressing member, wherein the clutch operating unit is located at a portion surrounded by a body frame and a front cowl.

4. The clutch operation mechanism according to claim 3, wherein the clutch operation unit is located adjacent to the clutch lever.

5. The clutch operation mechanism according to claim 3, wherein the drive force of the electric motor is transmitted to the second pressing portion via a worm.

6. The clutch operation mechanism according to claim 4, wherein the drive force of the electric motor is transmitted to the second pressing portion via a worm.

7. The clutch operation mechanism according to claim 2, wherein the drive force of the electric motor is transmitted to the second pressing portion via a worm.

8. The clutch operation mechanism according to claim 2, wherein the electric motor is mounted on a body frame in a position that is forward with respect to each of the clutch and the clutch lever.

9. A clutch operation mechanism comprising:

a clutch;

an operating cylinder operatively connected to the clutch for performing a disengaging and an engaging operation of the clutch;

a master cylinder for generating a hydraulic pressure in the operating cylinder;

a hydraulic line providing communication between the operating cylinder and the master cylinder, a clutch lever for manually operating the disengagement and engagement of the clutch; and an electric motor for generating a drive force adapted to selectively enable automatic disengagement and engagement of the clutch not by the manual operation;

a first pressing portion for converting the clutch lever operating force into a pressing force;

a second pressing portion for converting the electric motor drive force into a pressing force; and a turn-pressing member turned by being pressed by the first or second pressing portion to apply a pressing force to the master cylinder;

said first and second pressing portions being located at respective positions capable of turning the turn-pressing member in the same direction and opposite to a turning center of the turn-pressing member, wherein the turn-pressing member pivots about a swing shaft supported by the gear case.

10. The clutch operation mechanism according to claim 9, and further including a clutch operation unit having the master cylinder, the first pressing portion, the second pressing portion, and the turn-pressing member, wherein the clutch operating unit is located at a portion surrounded by a body frame and a front cowl.

11. The clutch operation mechanism according to claim 10, wherein the clutch operation unit is located adjacent to the clutch lever.

12. The clutch operation mechanism according to claim 10, wherein an opening and closing control valve is operatively connected to the hydraulic line.

13. The clutch operation mechanism according to claim 11, wherein an opening and closing control valve is operatively connected to the hydraulic line.

14. The clutch operation mechanism according to claim 9, wherein an opening and closing control valve is operatively connected to the hydraulic line.

15. The clutch operation mechanism according to claim 9, wherein the electric motor is mounted on a body frame in a position that is forward with respect to each of the clutch and the clutch lever.

16. The clutch operation mechanism according to claim 9, wherein the drive force of the electric motor is transmitted to the second pressing portion via a worm.

* * * * *